United States Patent
Leather

(10) Patent No.: US 9,900,265 B2
(45) Date of Patent: Feb. 20, 2018

(54) MATRIX SWITCH

(71) Applicant: Infineon Technologies AG, Neubiberg (DE)

(72) Inventor: Paul Simon Holt Leather, Berlin (DE)

(73) Assignee: Infineon Technologies AG, Neubiberg (DE)

( * ) Notice: Subject to any disclaimer, the term of this patent is extended or adjusted under 35 U.S.C. 154(b) by 123 days.

(21) Appl. No.: 14/305,288

(22) Filed: Jun. 16, 2014

(65) Prior Publication Data

US 2015/0365877 A1  Dec. 17, 2015

(51) Int. Cl.
*H04W 40/12* (2009.01)
*H04L 12/933* (2013.01)

(52) U.S. Cl.
CPC .................. *H04L 49/101* (2013.01)

(58) Field of Classification Search
None
See application file for complete search history.

(56) References Cited

U.S. PATENT DOCUMENTS

| 7,079,809 | B1 | 7/2006 | Scherzer |
| 2003/0174099 | A1 | 9/2003 | Bauer et al. |
| 2006/0056357 | A1 | 3/2006 | Payne et al. |
| 2011/0076966 | A1 | 3/2011 | Ishimiya |
| 2013/0083833 | A1 | 4/2013 | Robert et al. |
| 2014/0227982 | A1* | 8/2014 | Granger-Jones ..... H04B 7/0404 455/77 |

* cited by examiner

*Primary Examiner* — Kouroush Mohebbi

(74) *Attorney, Agent, or Firm* — Eschweiler & Potashnik, LLC

(57) ABSTRACT

A matrix switch comprises a number of switching elements configured in a matrix and a controller that operates to dynamically select one or more signal routes via the switching elements. The matrix switch can operate to dynamically route multiple signal routes between antenna ports to one or more transceiver ports, transmitter ports, receiver ports or termination ports. The controller can select the signal routes based on a set of criteria, which can include one or more use conditions, radio resource conditions or propagations conditions.

25 Claims, 8 Drawing Sheets

MATRIX SWITCH

FIELD

The present disclosure is in the field of communications, and more specifically, a matrix switch for communications.

BACKGROUND

Mobile wireless devices such as smart-phones, tablet PCs and laptop computers, often comprise a number of radio transceivers, which enable devices to connect to cellular radio networks, local area networks and combinations of different networks as well as devices not part of a network. In order to provide enhanced data rates over such radio networks, convenience encourages combining individual radio frequency carriers using carrier aggregation techniques. These techniques combine two or more component carriers from the same band (intra-band contiguous and intra-band non-contiguous) or from different bands (inter-band non-contiguous). Carrier aggregation can be used to enhance the data rate of both downlink and uplink alike. The combination of carriers facilitates wireless devices to operate multiple transceivers. In addition to carrier aggregation, diversity techniques and spatial multiplexing increase the throughput of a communications channel, but also involve operating multiple transceivers simultaneously.

DETAILED DESCRIPTION

Figure 1:
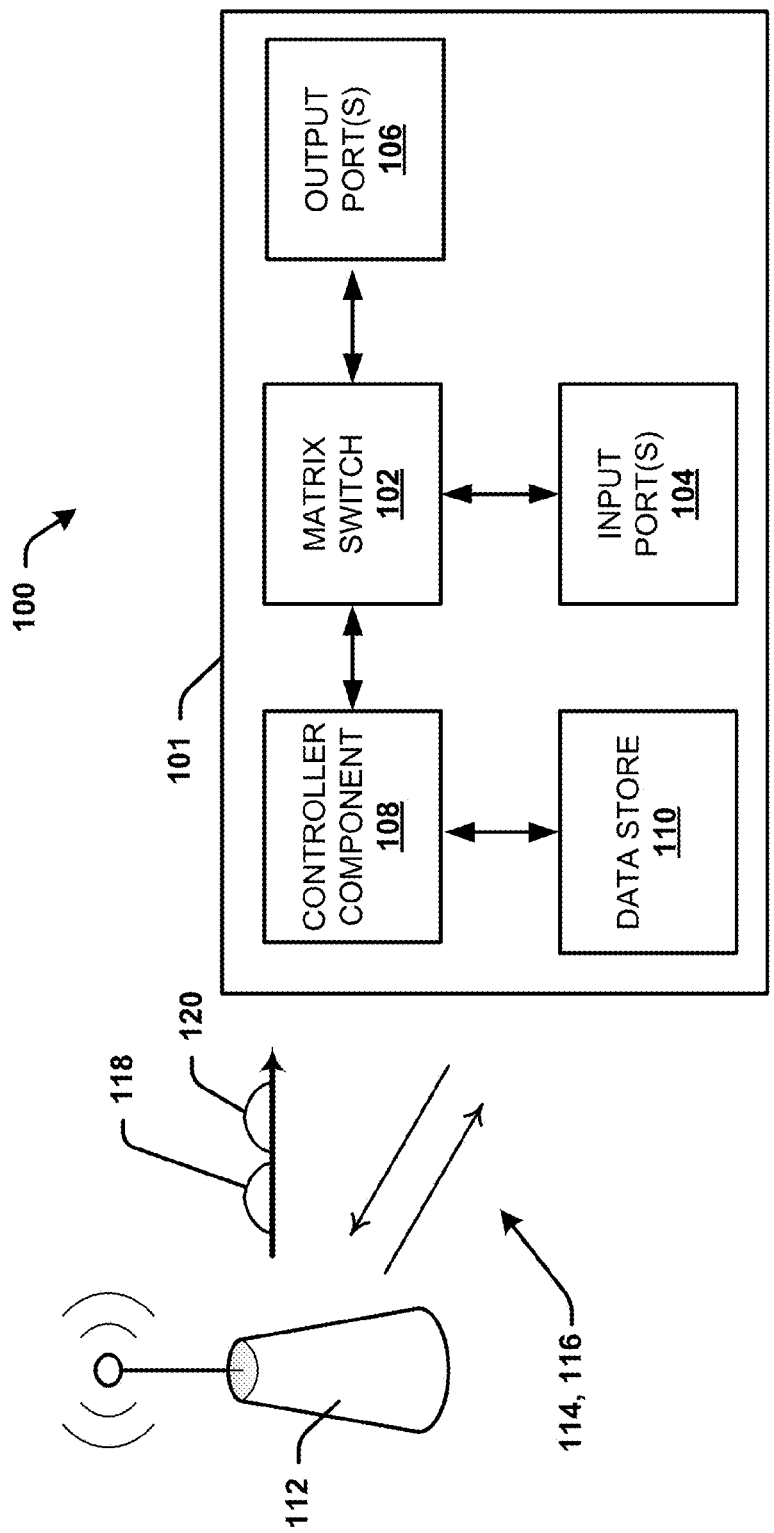
FIG. 1 is a block diagram illustrating a communication environment for utilizing a matrix switch according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of radio communications, various aspects for wireless devices to utilize at least one of diversity reception, carrier aggregation, or multi-input-multi-output (MIMO) devices with a matrix switch are described. The matrix switch can include a set of switching elements. The switching elements can be configured, activated, or modified in a matrix configuration of the matrix switch in order to dynamically generate different signal routes from among inputs and outputs, or various ports coupled to the matrix switch. Input ports and output ports can be configured in a matrix configuration of the matrix switch as columns, rows or layers, for example.

The signal paths can be generated via switching elements of the matrix switch for the communication of one or more communicatively coupled antennas, transceivers, receivers, transmitters, terminations, communication components or other devices, for example, according to changes of different criteria or the criteria identified. In response to detection or reception of a criterion, a controller component can operate to control the generation of the signal routes, or communication pathways, through the matrix switch for utilizing diversity reception, carrier aggregation or MIMO system operations with various switch elements or routes, which can be differentiated from one another based on corresponding operations or criteria. The communication along the signal routes can comprise radio frequency (RF) communications, which can include frequency ranges within a radio frequency range and/or a microwave frequency range. RF communications as used herein can include both, one or the other.

For example, a matrix can comprise an array of switching elements in a matrix configuration that routes a set of communication inputs and a set of communication outputs of M rows and N columns, wherein M and N comprise an integer that is at least one. The switching elements can comprise matrix elements, in which more than one element of a matrix can connote a matrix size that is greater than one by one (1×1), for example. The matrix configuration can comprise a square matrix or other matrix configuration such as a rectangular matrix or the like, in which the M rows and N columns are not equal in number to provide a plurality of switches for switching routes, signal routes, communication routes or pathways among inputs and outputs.

The matrix switch can further comprise a controller component, a controller or a processor, for example, that is communicatively coupled to the matrix configuration of switching elements and operates to control or generate a selection of a signal route of the signal routes based on one or more criteria that comprises a use condition, a radio resource condition, or a propagation condition, for example. Additional aspects and details of the disclosure are further described below with reference to figures.

FIG. 1 illustrates an example of a communication environment 100 that generates different communication routes in a matrix switch or a matrix switch component of a wireless device in accord with various aspects described. The communication environment 100 can comprise a network device 112 (e.g., a base station) and a communication device 101 such as a wireless communication device that utilizes at least one of diversity reception, carrier aggregation or MIMO component processing to facilitate different component carriers, multi-path propagations, or multiple receiver and transmitter components via a single switching component, for example.

The network device 112 and the communication device 101 can be communicatively coupled via a downlink port 114 and an uplink port 114 of an air interface, for example. The network device 112 can represent one or more network devices that operate to generate a coverage area of one or more homogeneous or heterogeneous networks for the communication device 101 such as a user equipment device or a wireless device that operates to communicate wirelessly with the network device 112. The network device 112 can comprise one or more macro (cell) network devices that broadcast macro network zone coverage areas or one or more micro network devices (e.g., Pico network access point, Metro network access point, Femto network access point, or other similar micro network access points) deployed within the wireless communications environment 100 and servicing one or more devices 101 in corresponding network coverage zones. Each wireless communications network (e.g., macro access points or micro access points) can comprise one or more network devices (e.g., a set of network devices), such as base stations that operate in conjunction with one another in order to process network traffic (e.g., handoff operations and coverage) for the one or more devices 101. The network devices (e.g., 102, 104, 106, 108) can be neighbors within one another that overlap or have coverage boundaries alongside or proximate to one another. Macro network devices can comprise a set of network devices that are cellular enabled network devices, which could provide different network speeds (e.g., 2G, 3G, 4G, etc.). In another example, micro access point devices can include a set of network devices that extend network coverage or expand the network environment 100 at the cell edge, especially where access would otherwise be limited or unavailable, and can include any standard such as for example WCDMA, GSM, CDMA2000,TD-SCDMA, WiMAX, or LTE or other solutions. The wireless communications environment 100 and other environments or systems herein are not limited to any one implementation as depicted by examples, and various other architectures can also be employed. For example, one or more network devices 112 of the communication environment 100 can deploy any number of Wi-Fi access points and respective service areas within the wireless communications environment 100, further comprise other network mechanisms, and other network layers and technologies. Additional examples also include non-networked devices that are operable within a wireless communications environment.

The device 101 comprises a matrix switch or a matrix switch component 102, a set of input ports 104, a set of output ports 106, a controller component 108 and a data store 110 that utilizes at least one of diversity reception, carrier aggregation, MIMO communications, or any combination thereof. The matrix switch 102 can facilitate different communication routes or signal routes between the set of input ports 104 and the set of output ports 106. For example, the matrix switch 102 can operate switching or switchable elements (switches) that provide connections for at least one antenna and at least two transmitter/receiver/termination components, or at least two antennas and at least one transmitter/receiver/termination component for a matrix configuration that is greater than 1×1, for example.

The set of input ports 104 can comprise connections, for example, to one or more receivers or antennas that can correspond to different bandwidths, different operating frequencies, or different networks of various network devices communicating with the device 101 according to the radio resource conditions such as available resources or configurations at the set of input ports, devices coupled to signal routes, circuits or components coupled thereto. The output ports 106 can likewise comprise connections, for example, to one or more transmitters, receivers, transceivers, terminals, terminations, or the like that correspond to different resource conditions of different bandwidths, different operating frequencies, different networks or network devices, for example. A port can not only comprise a connection, but can also comprise an address, a channel, separate communication/signal route terminal or other separate component that comprises a logical or a physical link for communication of different signals to one or more communication components of the communication environment 100.

The device 101 further comprises a processor, a controller or a controller component 108, for example, that can communicate with one or more data stores 110 to process and store various communications utilized in carrier aggregation, diversity reception or MIMO channel processing within the communication environment 100. The controller component 108, for example, can be a digital signal processor, microcontroller, a transceiver processor, logic array, arithmetic logic array, or any other component that operates to receive one or more data and transform the data to operate the matrix switch 102 for configuring different signal routes between the input ports 104 and the output ports 106. The controller component 108 can operate to determine or store one or more criteria and facilitate communications by generating different signals routes of the matrix switch 102 based on the various criteria.

For example, the controller 108 can be operatively coupled to the matrix switch 102 and be a specialized controller 108, for example, that operates to select signal routes via a number of switches or switching elements (e.g., two or more switching elements) of the matrix switch 102 according to criteria that comprises a use condition, a radio resource condition, or a propagation condition.

Use conditions can include, for example, but are not limited to, operations, processes, or algorithms that the device 101, the matrix switch 102 or any component coupled thereto is directed, orientated, angled, handled, or encountered upon with respect to one more objects, object locations, or proximities of an object within the environment 100. For example, the object can include a user's hand, or any other object relative to the device 101. A use condition can include a velocity, acceleration, an orientation, or other parameter of the object, which can be sensed or determined with respect to the device 101 as a use condition or a condition of a present use of the device 101 within the communication environment 100 at a given time period. To this regard, the device 101 or the environment 100 can comprise one or more sensors (not shown) for providing at least one datum that can be utilized in determining the criteria as variables, factors or functions for generating switching/signal/communication/pathway routes or paths via the matrix switch 102.

In one example, radio resource conditions can include one or more resource parameters or resources available in the environment 100, such as radio requirements or radio configurations with respect to RF communications being received and processed. Radio requirements can comprise one or more operating frequencies, bandwidths, different networks of different network devices 112, Time Division Duplex (TDD) signal processes, Frequency Division Duplex (FDD) signal processes, regional/local networks and their parameters, and the like. The resources available can include radio configurations such as a number of antennas, antenna specific bandwidths, tuning mechanisms associated with the respective antennas and their frequency ranges, as with tuning circuits, networks available, switching routes in use and/or components for operating signal routes between the input ports 104 and the output ports 106, for example.

In another example, propagation conditions can include a direction, a polarization, a strength/magnitude of the RF communications or related conditions. The direction or the angle in which RF communications are received can vary in strength relative to the input ports 104. Different propagation conditions that can be sensed can cause different signal-to-noise ratios according to geometries, service range, distance to horizon, and the like conditions. The strength or line-of-sight propagation of one network communication could be different than another network communication based on a proximity of a coverage zone associated with one or more of the network devices 112. Polarization or orientation of incoming radio waves can also be a condition that is a factor for antenna selection, and thus, signal route selection via switching elements of the matrix switch 102. Maximum signal strength between stations or devices can occur, for example, when both stations and devices are using substantially identical polarization. As such, in response to identifying the polarization, the controller 108 can operate to choose an antenna port, input port 104, or a select signal propagation route via the matrix switch 102 by considering whether the polarization is linear, elliptical the like, as well as in consideration of other criteria.

The criteria determined, detected or received can operate as variables in which the controller 108 identifies/selects an optimal route to activate via switching elements of the matrix switch 102. The criteria can thus operate as dynamic criteria or criteria variables that change depending upon the communication environment in a given time frame. Further, the controller 108 can select signal routes through the matrix switch 102 and facilitate the matrix switch 102 to generate the selected routes as a dynamic function of one or more criteria or criteria variables, which themselves can contribute, not contribute and vary as part of or not part of the dynamic function based on the sensed criteria of the environment 100 for selection of the signal routes in the matrix switch 102. Although criteria are considered conditions herein, conditions, as used in this context, can also be a reflection of a current state of resources in time and within the environment 100, or a premise for operation such as with one or more communication parameters, for example, a frequency specific antenna, a certain bandwidth, a tuning circuit parameter or a tuning mechanism range, port specifications, related parameters or the like.

In another aspect, the device 101 can utilize various carrier aggregation solutions that can operate to expand effective bandwidth such as beyond 20 MHz, for example, or from another effective bandwidth. The carrier aggregation concept proposes to aggregate multiple component carriers to form a larger overall transmission bandwidth via the matrix switch 102. In case of intra-band carrier aggregation, the component carriers can fall into the same band with one physical input port 104, for example. Therefore, there can be a need for an efficient separation of component carriers. The matrix switch 102 is communicatively coupled to the matrix controller component 108 to further facilitate carrier aggregations solutions within the device 101, or increase the bandwidth of the downlink 114 and the uplink 116 between one or more network devices 112 and the device 101. Thus, multiple component carriers 118 and 120, for example, can be aggregated to form a large overhaul transmission bandwidth for the downlink port 114 or the uplink 116 via the matrix switch 102.

The two carriers 118 and 120 utilized, for example, in the downlink 114 can be received by an input port 104 or receiving component connected at one or more input ports 104 to the matrix switch 102. Likewise, the same can apply to the uplink 116 and output ports 106. The first and second carriers 118 and 120 can, for example, be received via an antenna, a receiving circuit, or other receiving component coupled to the input port 104, which distributes the in-bounding and out-bounding signals to the input ports 104 and output ports 106 by way of the selectively generated signal routes via switching elements of the matrix switch 102. In case of carrier aggregation, the first carrier 118 can be received and routed via a first signal path/route, wherein the second carrier 120 can be received and routed via a second signal path. Because the two component carriers 118 and 120 can fall into the same band with one physical input port, the component carriers 118 and 120 can be separated so that routing can occur in the two separately selected communication paths concurrently, at about the same time or simultaneously.

Further, the device 101 can operate to utilize diversity reception, in which different components can be processed and routed via different antenna ports or input ports 104 for processing. In addition, communications can be received by the device 101 from a diversity of network devices, such as a Wi-Fi network device that operates a coverage zone for a Wi-Fi network, or a macro network device that operates a macro cell coverage area for a typical cell network. The input ports 104 can thus operate for diversity reception processes, in which one or more input ports are utilized for signals to be received, transmitted, processed, or stored in part based on the antenna port or input port specifications associated with different communications or the criteria discussed above. For example, the input ports 104 can comprise antenna components having at least one of an antenna, a tuning mechanism associated with an antenna, or a frequency tuning circuit associated with the antenna for varying frequencies within one or more ranges.

A plurality of signal routes can further be selected and generated via the plurality of switching elements of the matrix switch 102 and the controller component 108, in which the signal routes can communicatively couple/route one or more input ports 104 and one or more output ports 106 for a MIMO device as a function of the criteria. The controller component 108, for example, can be configured to identify conditions related to carrier aggregation or diversity reception as the set of criteria, and further select, from among the signal routes, one or more signal routes that operate to increase a bandwidth capacity with a plurality of component carriers, or operate to mitigate effects of a multipath communications that can occur via a MIMO device, such as cross-noise, jitter, phase shifting, fading or other potential effects of multipath communication.

Figure 2:
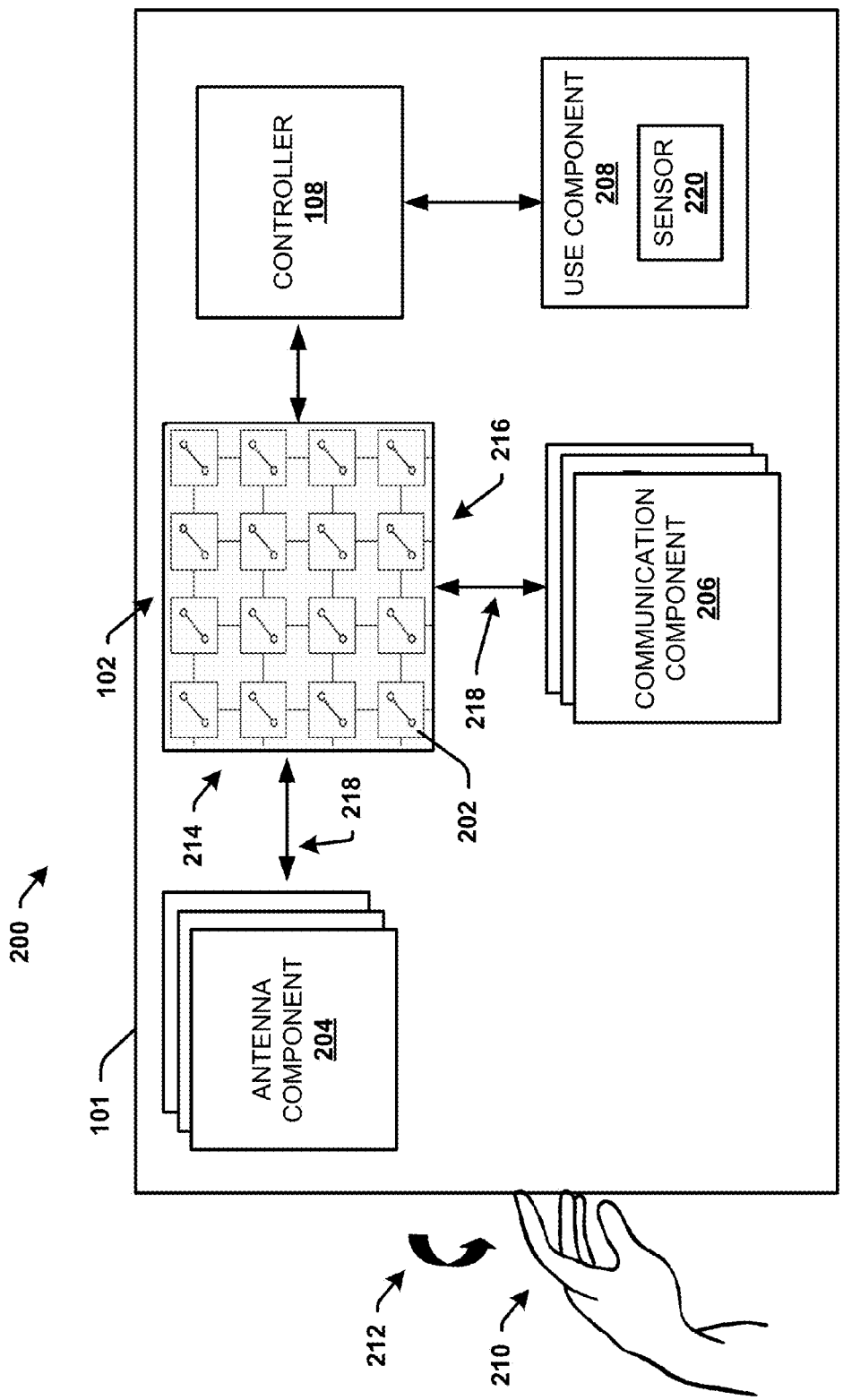
FIG. 2 is a block diagram illustrating a system for a matrix switch with switching elements for generating signal routes according to various aspects described.

Referring now to FIG. 2, illustrated is a system for facilitating one or more signal routes via switches of a matrix switch in accordance with aspects described. The system 200 can comprise the device 101 with similar components as discussed above, and further include switching elements 202, antenna components 204, communication components 206, and a use component 208.

The matrix switch 102 includes a set of switching elements 202 that operate to form signal routes, communication paths, pipelines or the like routes based on one or more criteria. The switching elements 202 can be arranged in a matrix configuration, for example, which can enable selective switching to occur among one or more of the switching elements 202 by the dynamic generation of dynamic switching routes through a matrix. The matrix can comprise M rows 214 and N columns 216, for example, in which M and N can each comprise an integer that is at least one. In one example, the matrix configuration of the switching elements 202 can comprise at least one M row 214 and at least two N columns 216, or at least two M rows 214 and at least one N column 216. In one example embodiment, the M row(s) 214 and the N column(s) 216 are not equal, such as where M is three and N is four. In another example, M and N can be equal such as M=N=4, or other such integers greater than one, for example.

The controller 108 can operate to generate signal paths or routes via the matrix switch 102 by controlling the switching elements or switches 202 within the matrix configuration. The switches 202, for example, operate to activate, modify or enable a signal route for transmission along one or more signal routes concurrently or simultaneously. The signal routes of the switching elements 202 that are selected or activated by the controller 108 can comprise any number of the M rows 214 and N columns 216 of the matrix configuration. In other words, one or more M rows 214 can have operational switches of switching elements 202 that generate one signal path, and also one or more N columns 216 with operational switches of the switches 202 to facilitate generation of the same path, or a second different path can be generated concurrently via one or more different switches of the matrix switch. For example, switches from two rows and three columns could generate one signal route, while switches from one row and two columns generate another, in which one or more switches could facilitate both of the signal routes activated or only one signal route at a time. In addition or alternatively, each signal route can be generated with one switching element operating at an intersection of the rows and columns in the matrix configuration, such as at a row-column pair or of a row-column-layer pair. For example, an antenna component from among the antenna components 204 could be coupled to the second row of the M rows 214, while a communication component from among the communication components 206 could be coupled to a third column 216. A single switching element 202 at an intersection of the second row and third column can facilitate a signal route between the antenna component of the second row and the communication component of the third column without other switching elements within the matrix configuration being utilized.

The switching elements 220 can formulate the matrix elements of the matrix configuration and operate according to controller commands for activating or modifying various routes as a function of criteria. The criteria can be determined (e.g., identified, detected, ascertained, obtained, sensed or the like) in a dynamic manner with respect to signaling data such as with RF communications, for example. The criteria also can be received, stored, or ascertained from the conditions (e.g., resources, electronic configurations, variables, parameters, etc.) present in the system 200 with respect to the generation of routes via the matrix switch 102 and the component elements being joined via the routes. These conditions can comprise communication parameters, resources available, or variables that characterize or quantitate communication functions in the system 200. For example the criteria can comprise use conditions, radio resource conditions, propagation conditions, or any combination thereof.

The switching elements 202 can comprise one or more switches that can be modified, selected, or activated, for example, to open or connect one connection point to another, such as from one or more communication components 206 to one or more antenna components 204, or vice versa from one or more antenna components 204 to one or more communication components 206. Further, the switching elements 202 of the matrix switch 102 can be inactivated or modified to close out, cancel or alter a signal route from one switching element to another switching element so that a signal route from a neighboring switching element is no longer operational in time via the one switching element or routed from the one switching element to the another switching element.

The communication component 206 can be communicatively coupled to one or more output ports or terminations of the matrix switch in a determination. The communication component 206 can include one or more of transceiver(s), receiver(s), transmitters(s), termination(s), terminal(s), antennas, ports, other similar communication device components, or any combination thereof, for example. The antenna component 204 can also include any combination and any number of one or more of transceiver(s), receiver(s), transmitters(s), termination(s), terminal(s), antennas, ports, or other like communication device component. In addition, an antenna component 204 or a communication component 206 can be connected to the matrix switch 102 via one or more connections 218 of respective rows or columns. Each connection 218 can connect one or more antenna components 204 or one or more communication components 206. One connection, for example, can exists between the switching elements 202 of the matrix configuration of the matrix switch 102 and each communication component 206, or multiple connections can connect one communication component 206, for example, in which the same can apply for characterizing connections of the antenna components 204. Furthermore, one or more of different antenna components 204 or communication components 206 can be coupled to one or more sets of connections at one or more sides of the matrix switch 102, or to all sides of matrix switch 102 for generation of signal routes for communications among different components in all directions or from various dimensions relative to the matrix configuration of switches 202 in the matrix switch 102, for example.

The signal paths of the matrix switch 102 can be generated via the switching elements 202 for the communication of one or more communicatively coupled antennas, transceivers, receivers, transmitters, terminations, communication components or other devices, for example, according to changes of different criteria, which can comprise criteria variables that change with changing environmental conditions not in control, or in control, by the device 101 or by other associated factors. The different criteria can also change according to what particular criteria are identified as factors within a set of criteria, in which communication routes can be generated as dynamically determined functions comprising different factors that further operate as variables for quantitization of one or more functions for selecting and configuring the switching routes. In response to detection or reception of a criterion, the controller 108 can operate to control the signal routes or communication routes that are generated through the matrix switch for utilizing diversity reception, carrier aggregation or MIMO system operations.

The switching elements 202 can comprise one or more switches that can be an electro-mechanical device or other like switch that facilitates one or more communication contacts, such as signal path connections, electrical connections, relay connections, driving connections, or the like. Further, the switches can operate to activate, open, direct or generate propagation pathways as the signal routes, or the like in one or more directions, one or more mediums, one or more frequencies or speeds with one or more patterns or forms of energy (e.g., phases, directions, magnitudes, light, electrical, mechanical, acoustic, etc.).

The use component 208 can operate to determine use conditions, such as the presence of an object 210, a location of the object 210, a proximity or distance of the object 212 with respect to a reference point, an orientation 212 of the device/switch with respect to the object 210 or a relative direction (e.g., North), or another condition of use of the device 101 or with respect to the matrix switch 102. The use component 208 therefore can operate to determine, detect, or identify the use conditions for the controller 108 to select one or more signal routes with various switches 202 of the matrix switch 102 and to process and facilitate switching routes in operation with the controller 108.

The object 210, for example, can be one or more hands, or other object (e.g., a tree, large structure or device cover sensed or detected in location, proximity, presence, etc.) by one or more sensors 220 coupled to or a part of the use component 208, such as for heat, light, touch, location or the like sensed condition or other physical meaning with respect to the device 101, the switch matrix 102 or other illustrated component of the system 102. The orientation 212 of the matrix switch 102 or the device 101 comprising the matrix switch 101 can be determined or detected by the use component 208 or by the one or more sensors 220. For example, the sensor 220 can be one or more sensors that include proximity sensors, location detection sensors, orientation sensors, accelerometers, inclinometers, or the like.

The controller 108 can operate in communication with the use component 208, for example, to facilitate selection, activation or modification of one or more signal routes via the switches or switching elements 202 based on, or as a function of, one or more use conditions detected, or one or more changes in the one or more use conditions. The controller 108 in communication with the use component 208 can thus be configured to identify conditions related to carrier aggregation, diversity reception, or MIMO operations in the use conditions as the set of criteria, and select a signal route, from among potential signal routes with the switching elements 202, based on the use conditions identified. The signal routes can be selected to operate for an increase in a bandwidth capacity as a criteria condition with one or more component carriers or mitigate an effect of a multipath communications with respect to, or as compared with, other signal routes of among the switching elements 202. The use component 208 can operate to maximize diversity, carrier aggregations or MIMO operation via a signal route relative to the antenna components 204 or the communication components 206. In a case for example where hands are present on one side, but not another side of a device 101 (e.g., a mobile device or other device), the matrix switch 102 can operate to generate signal routes between a communication component 206 and an antenna component 204 to maximize reception or increase a signal strength/reception/magnitude for a greater signal-to-noise ratio by activating a signal route for a different antenna, for example, than a signal route to an antenna that is in closest proximity or proximate to the hand object 210. The same functioning can be said for the operation of the controller 108 or the use component 220 with other conditions or use conditions described herein. In addition, a plurality of signal routes can be generated via the plurality of switching elements of the matrix switch that respectively communicatively couple antenna components 204 and communication components 206 as the function of the one or more criteria for carrier aggregation, diversity reception, or MIMO processes.

In one aspect, a mobile wireless device can include one or more radio transceivers and a radio frequency front end to route signals between the one or more antennas and the one or more transceivers, or any other component (e.g., filter, amplifier, impedance, etc.). The direction of signal flow can be dependent on the use of a particular radio component, whether for transmission or reception. Front end circuits can also comprise additional components that condition signals that can include, but are not limited to the combination and function of amplification, filtering, frequency translation and switching.

Mobile wireless devices can comprise one or more antennas, and the orientation or manner, in which these antennas are oriented and the way in which the mobile wireless device is deployed, can affect the radio frequency performance of the antennas, and hence the throughput of the data communications channel. This in turn can affect the quality of the connection and the experience of the user equipment (e.g., device 101) or the UE experience. As an example, the position of the user's hand or other object with respect to one or more zones or area in which a first antenna component 204 and a second antenna 204 can affect the performance of the antennas or antenna components located within these zones or specific areas of the device 101. Routing of RF signals can be performed according to particular use cases/conditions to select one zone having one set of antenna 204 or communication components 206 located thereat over another zone having different antenna 204 or communication components 206. The zones can be different locations within the device 101, for example, that comprise different antennas or antenna configurations.

Further, different signal routes for different corresponding bandwidths, tunable elements/circuits, or different resources can comprise different modes of operation of the switches 202. One zone can be selected based on criteria that correspond to a particular mode of operation (e.g., FDD, TDD, network connection, or the like). The controller 108 can be configured therefore to assess, ascertain or receive the different modes and the different zones associated with the device 101 or the switches 202, along with associated specifications or specific functioning related to each. The controller 108 can operate to configure the switches based on the criteria discussed above, modes of operation, zone location and resource specification/parameters related to each zone and mode of operation.

Figure 3:
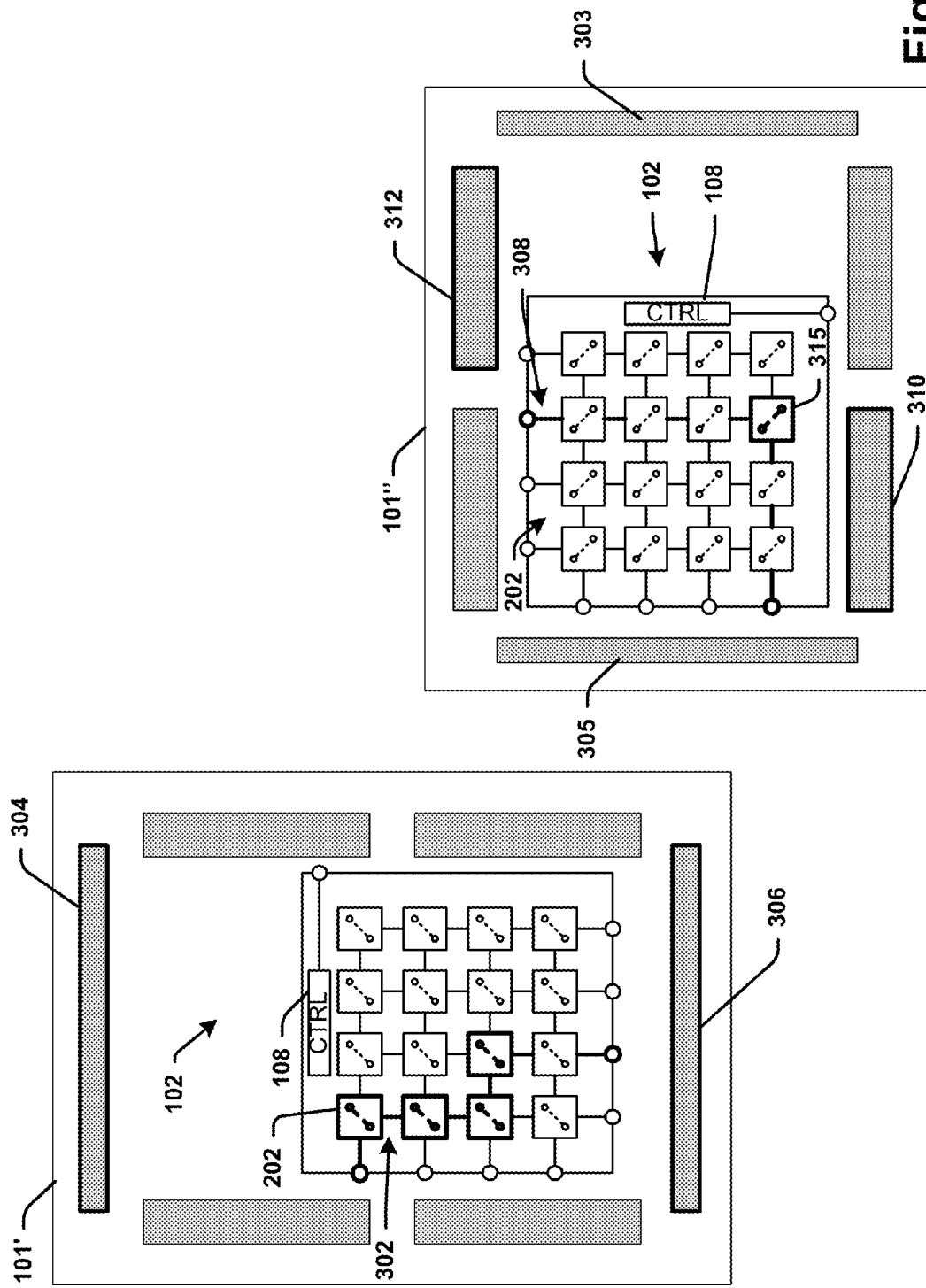
FIG. 3 is a block diagram of a device utilizing matrix switching according to various aspects described.

Referring to FIG. 3, illustrated is an example of a use case or use condition, in response to a user could be using the device 101 (e.g., a mobile wireless device) to view the screen (not shown) in a landscape orientation at the device 101" versus in a portrait orientation at the device 101'. The device 101" in a landscape orientation can be useful when watching a moving picture or video content that has landscape orientation or when playing games that require more screen width than screen height, for example. When the viewing of such content or the playing of such a game requires the wireless mobile device to simultaneously transfer data via a radio network, the placing of either or both the user's left hand and right hand or the fingers thereof in the vicinity of either or both different antenna zones, such as antenna zone 303 or 305, for example, can affect the radio frequency performance of one or more of the antennas located in the zones 303 or 305. The controller 108 can therefore change the signal route 302 based on the condition of use (e.g., orientation, object location, etc.) of the device 101 to a signal route 308, illustrated at device 101", for example, that is more optimal to a more optimal zone as well as vary the zones operational as a result of the modification of switching paths 302 and 308 (further illustrated in bold). Otherwise, the reduced radio frequency performance of the antennas at a zone interfered by the object can result in lower throughput of the data communication channel or route that is activated, and thus degrade the experience of the user with the user equipment device. Additionally or alternatively, the antenna zones 304 and 306 could remain activated while other zones (e.g., 310, 312) remain inactivated, not powered, or in use for antenna optimization or mitigation of effects of interference by either other antenna zones or other active routes within the matrix switch 102, such as to a termination point or a termination, for example. Further, the antenna zones can change with a change in a signal route via modification of the switches 202 by the controller 108 based on a change of a use condition, for example, or detection of another use condition factor, which could provide another variable that further quantitizes a function of or a weight of a selection of a signal pathway/route for the controller 108 to select a signal route configuration via the switches 202 of one route over another, an additional route, or no further route nearby.

The different antenna placement zones can overcome the performance restrictions imposed by different zones (e.g., two zones) for certain use cases, in which the user's hand, hands, finger or fingers, or other surrounding object could interfere with the operation of the antennas or device components (e.g., transceivers, receivers, transmitters, terminations, filters, amplifiers, beam emitters, beam components, light emitters, light components, other electronic components, portions thereof, etc.) coupled within one or more zones. It should be noted that the placement of the zones are illustrative of examples for describing various aspects herein with ease of reference, while depicting those areas in which an antenna or other device component could be located, and should be considered illustrative of possible zone placements.

In order to provide a means of connecting any antenna to any device component, or any combination of antennas to any combinations of device components, various different signal routes can be selected based on other criteria described herein and further discussed herein infra. A device or user equipment equipped with one or more antenna components for the purpose of at least one of carrier aggregation, diversity reception or MIMO device operations can be satisfied by a means or dynamic switching of routes via the switches 202 to route signals between the antenna components and the device components such that the connection of the same can be readily adapted to changes in use conditions, radio resource conditions, propagation conditions or any combination of the factors thereof.

In one aspect, the signal routes 302 and 308 can be generated via one or more switching elements 202 that are located at cross sections or at intersections between one or more dimensions of the matrix, such as with rows or columns of the matrix configuration illustrated. In addition or alternatively, other switches not located at intersections of the rows and columns could also be utilized so that any number of switching elements 202 can be dynamically configured to generate a signal path in one or more directions based on different criteria described herein, such as in a chain of switching elements or a sequence of switching elements 202 for different signal route configurations.

Figure 4:
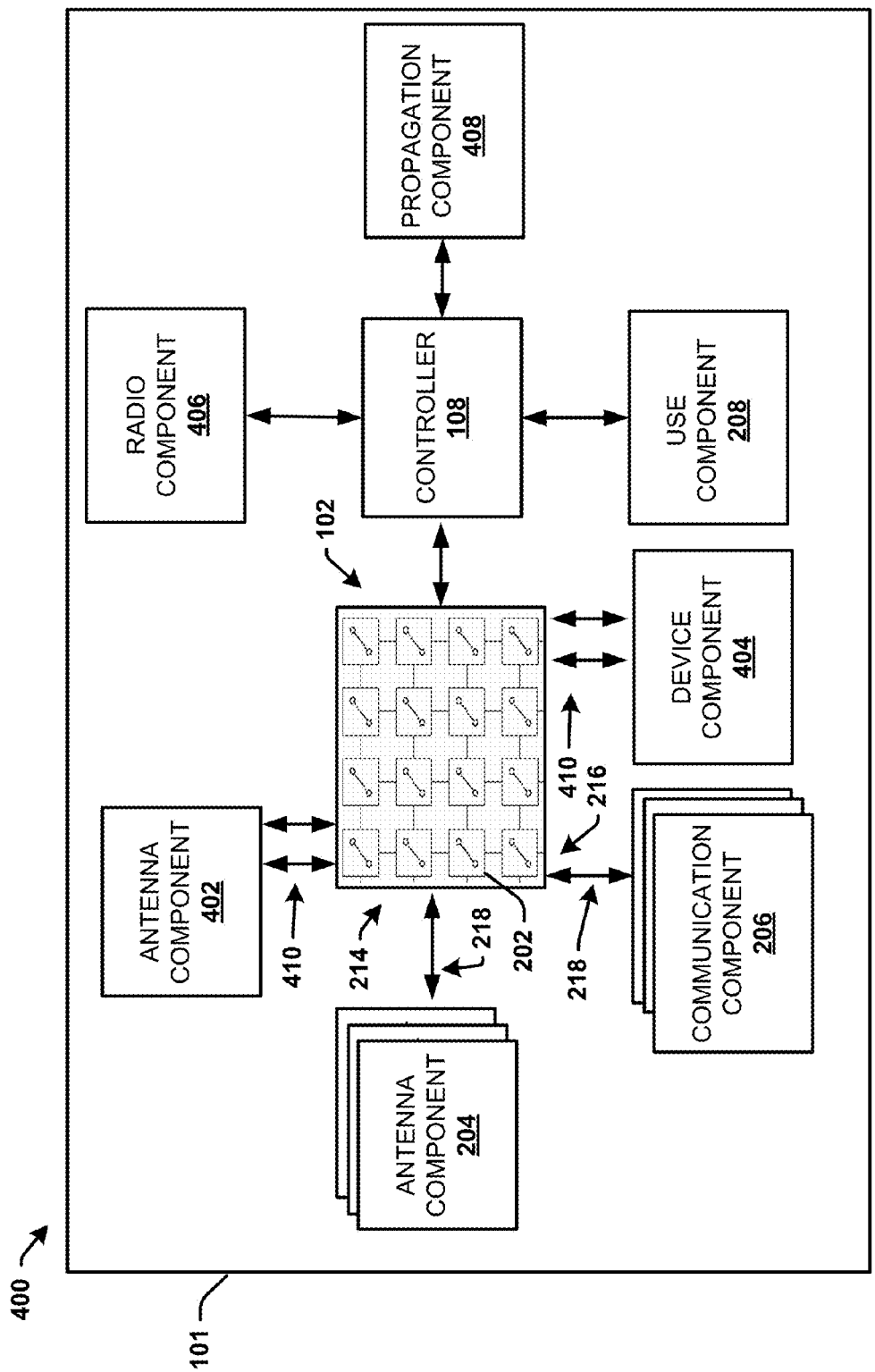
FIG. 4 is another block diagram illustrating various components of a matrix switch according to various aspects described.

Referring now to FIG. 4, illustrated is a system for generating propagation paths, communication routes, signal pathways or routes dynamically via a matrix switch in accord with various aspects described. The system 400 comprises similar components as discussed above and further includes an antenna component 402, a device component 404, a radio resource component 406, and a propagation component 408, which are communicatively coupled to a matrix switch component (e.g., matrix switch 102).

The matrix switch 102 is coupled to one or more antenna components 204 and one or more communication components 206, as discussed above. In addition, the antenna component 402 and the device component 404 are also coupled to the matrix switch 102 at an additional or a different dimension or side of the matrix switch 102 with respect to the antenna component(s) 204 and communication component(s) 206. The matrix switch 102 can be configured to provide various dimensional input and outputs at one or more different physical dimensions (e.g., along a z-axis). Although three sides are illustrated here as intersecting various components comprising the antenna component 204, the communication component 206, the antenna component 402 and the device component 404, other sides or dimensions of the matrix switch 102 can integrate other dimensions to couple other antenna components, communication components or device components, and the present embodiment is an illustrative example of the multi-dimensional flexibility of the matrix switch 102.

For example, the matrix configuration of the switching elements 202 of the matrix switch 102 can be extended in different ways as a function of the different switching elements 202 comprising the matrix. The switching elements 202, for example, can comprise switches that propagate pathways or routes in various different directions and dimensional spaces that can provide for light paths, acoustic pathways, electrical paths, signaling paths or other type routes. In addition, the switching elements 202 can comprise switches that are not just configured in a four by four matrix as illustrated in FIG. 4, but can span different arrays of space with different numbers of switching elements comprising additional rows, additional columns, or additional dimensions other than the illustrated two-dimensional space. For example, the matrix configuration of the switches can include the rows and columns, and further comprise layers so that the matrix can be configured in a three-dimensional matrix, for example, with M rows, N columns and O layers, in which M, N and O can comprise an integer of at least one. The matrix switch 102 as illustrated can also represent multiple different matrix switches within the system 400, which can vary in size and dimension with respect to one another.

The switching elements 202 can operate to couple or route multiple different directions to other switches, inputs or outputs, components between the antenna components 204, 402, communication components 206 and device components 404, and in different components thereof within each matrix configuration. For example, the matrix switch can be configured to various other switch or within MIMO devices, in which the device component 404 can comprise a transceiver having a receiver end and a transmitter end with multiple different antennas at each receiver end and transmitter end for communication in a MIMO channel utilizing beam forming, channel state information, spatial diversity, queue state information and like MIMO processes to communicate concurrently or simultaneously to devices within the network environment via one or more of the antennas at transceiver ends.

For example, the device component 404 as well as the antenna component 402 can be communicatively coupled to the matrix switch along multiple paths 410, in which one or more signal routes generated in the matrix switch can be communicatively coupled to each of the paths 410. The signal routes generated via the switching elements 202 can extend to the antenna of each receiver end and/or transceiver end of the device component 404. The criteria for generating one path 410 over the other can be ascertained by the controller 108, which, in turn, can operate to dynamically generate various signal routes or paths among the switches based on MIMO operations, parameters or functioning for selection of a particular antenna, a particular tuning element/circuit for an antenna or an antenna component from among antennas of a transceiver end or a receiver end of the device component 404.

The device component 404 can comprise one or more components that are not limited to a communication component or an antenna, but can comprise a filter, an amplifier, monitor, diode, a termination for generation of a passive impedance, an active impedance, a forced perfect termination impedance or the like to create a parasitic effect or to mitigate a multipath propagation. The termination can be match impedance or resistor component, which could operate to prevent signal reflection, such as with RF signals being reflected back through the switch route generated. The switch route can be temporary and reconfigured to direct path flow of signal or other transmission dynamically or in real time such that as criteria changes the variables change as well as the type of criteria or criteria factors utilized in determining optimal signal routes for communication flow throughout the system 400 overall.

Signal routes or communication pathways via a matrix switch are dynamically or in real time selected, configured and modified by the controller 108 to utilize carrier aggregation, diversity reception, or MIMO device components based on one or more criteria related thereto. The radio component 406 is configured to dynamically determine radio resource conditions. The radio resource conditions can include one or more bandwidths associated with one or more antennas ports, antennas of at least one antenna port, a network availability such as a network speed or Wi-Fi option, a regional use such as a geographic network (e.g., LAN, MAN, etc.), or whether a mode of operation comprises a frequency division duplex operation or a time division duplex operation for one or more specialized pathway/route. The controller 108 can then utilize each criterion as a factor in a dynamic function or neural network function to select one or more signal routes and generate via the switching elements 202 in the matrix signal routes based on the set of radio resource conditions.

The propagation component 408 can be configured to dynamically determine the propagation conditions as a part of the criteria. The propagation conditions can comprise at least one of a magnitude, a polarization, or a direction of the set of RF communications being received, for example. Likewise, the controller 108 can operate to dynamically identify the set of propagation conditions comprising a strength, a polarization or a direction of RF communications, and configure the signal route selected from among the signal routes that can potentially be generated via the switches based on the set of propagation conditions via the switching elements of the matrix switch that correspond to the selection.

Figure 5:
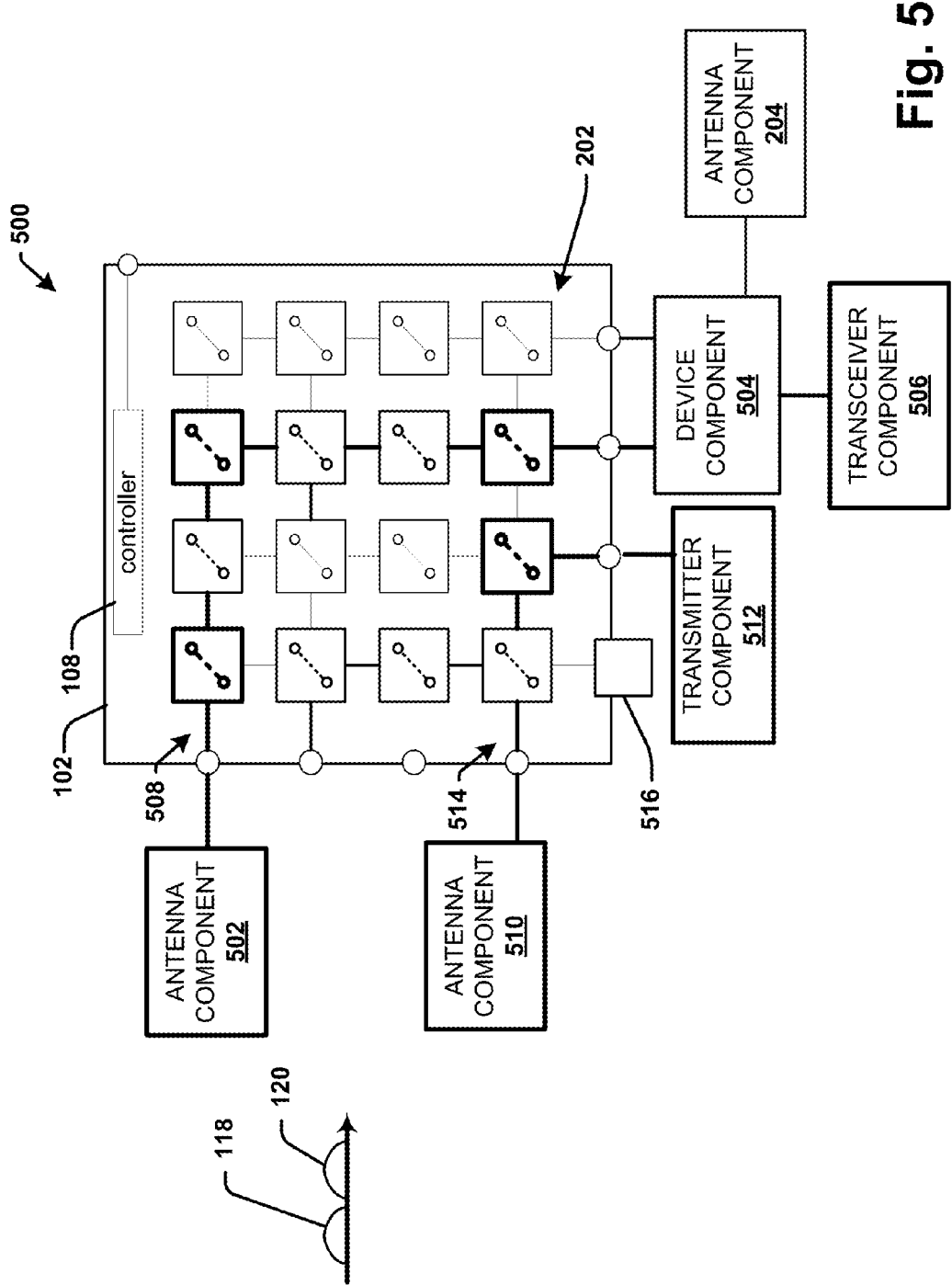
FIG. 5 is another block diagram illustrating a matrix switch according to various aspects described.

Referring now to FIG. 5, illustrated is a system for matrix switching via a matrix configuration of switches in accordance with various aspects. The matrix switch 102 and the matrix controller 108 can operate in conjunction with system components and different environments to dynamically identify conditions as criteria related to carrier aggregation, diversity reception and/or MIMO operations, for example, and select, from among different potential signal routes of the matrix, one or more signal routes 508 and 514 that operate to increase a bandwidth capacity with a plurality of component carriers 120 and 118. In addition or alternatively, the signal paths can be selected to mitigate various effects of a multipath communication, such as with one or more termination components 516 or terminations that can operate to mitigate parasitic effects or other effects from multipath propagations, such as for providing optimal pathways for transmission according to different communications. Use conditions, radio resource conditions, and propagation conditions can be example conditions that can be variable factors that are considered in selecting different signal routes or switching paths 508 or 514 via the switching elements 202 as well as other factors or conditions. These factors or conditions can include considering the conditions or use conditions via the use component 208 of other paths already generated via the matrix switch, and factor in the variable factors that were considered in the already formed or prior signal route generated for the selection/dynamic generation of further signal routes in a learning process. For example, potential interference could dictate generating an open or active signal route for a termination as well as a newly formed signal route to protect the newly formed signal route from current signal transmission of a current signal path. The resource limitations of a particular switching element could also be considered a use condition or factor, whereby if the switch is not able to open up additional routes through it, then a different route through the switch matrix can be selected by the controller 108.

In another aspect, the matrix switch 102 can generate various switching routes based on which components are coupled to one or more ports, inputs, or outputs of the matrix switch and to which secondary components are coupled to those components via the rows and columns of the matrix configuration. In one example, the antenna component 502 can be coupled via the switching route 508 to the device component 504, which can include one or more communication components, circuit elements, other devices or device components. In turn, the device component 504 can be coupled to the antenna component 204 and the transceiver component 506.

In one aspect, more than one signal path can be potentially generated between the device component 504 and the antenna component 502. The controller 108 is configured to generate the signal routes based on various criteria that can also include a particular component or device and parameters related thereto secondarily coupled to the matrix switch, such as the transceiver component 506 communicatively coupled to the antenna component 502 via the device component 504 and the signal route 508. For example, the controller 108 can operate to select the signal route 508 over other signal routes in the matrix switch as a result of one component carrier 118 to be communicated between the antenna 502 and the transceiver component 506, and another carrier component that could be communicated differently between antenna component 510 and transmitter component 512, for example. The pathways or routes can be dynamically modified according to environmental conditions, communication conditions, radio resource configurations, network resource availability, communication specifications, different networks communicating (e.g., Wi-Fi, 3G, etc.).

Figure 6:
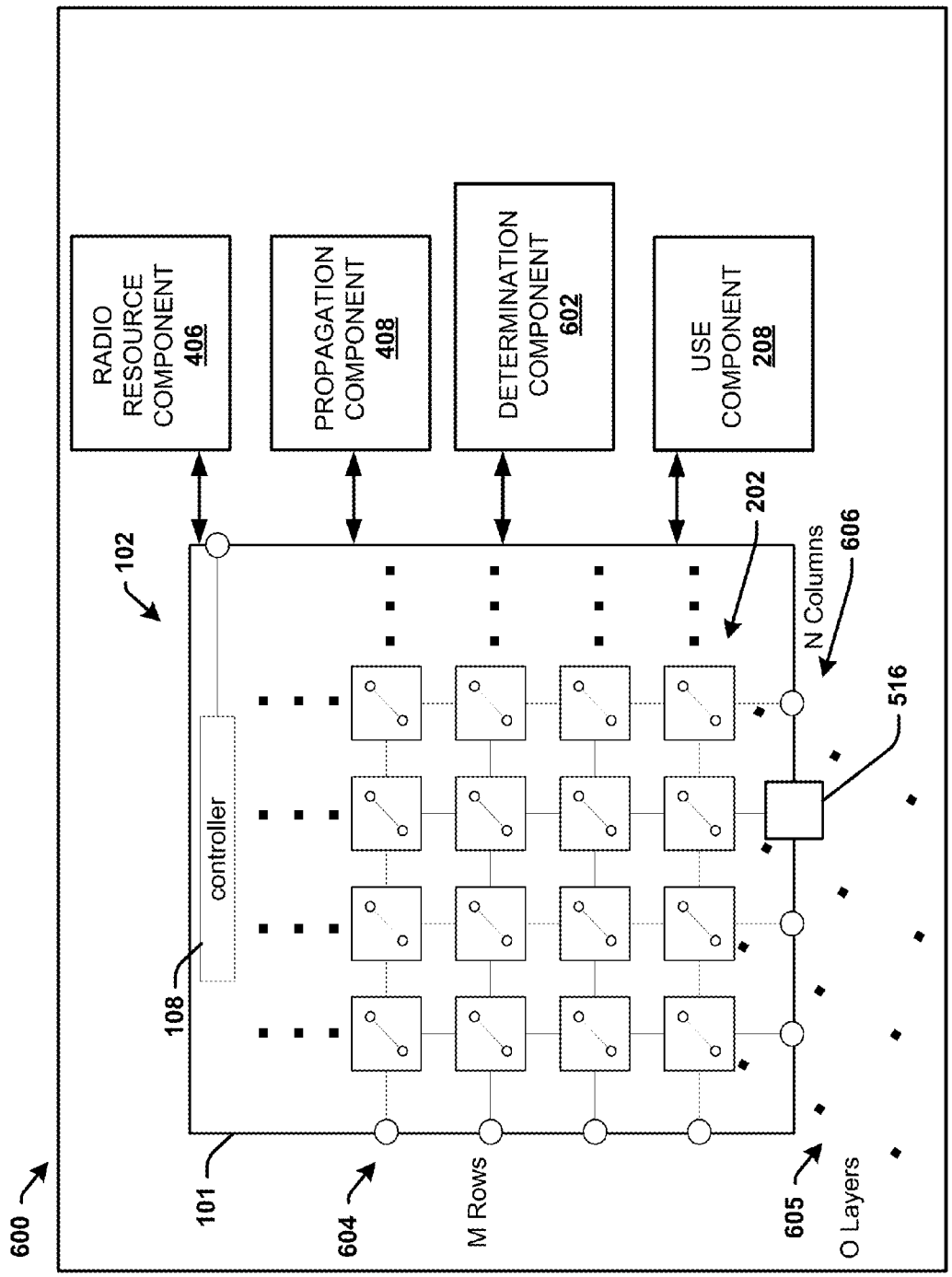
FIG. 6 is a block diagram illustrating another matrix switch according to various aspects described.

Referring now to FIG. 6, illustrated is a system 600 with matrix switching elements in accord with various aspects. The system 600 comprises similar elements as discussed above and further comprises a determination component, a set of M rows 604 of device ports, a set of N columns of other device ports 606, and O layers 605, in which M, N, and O can be any number comprising an integer that is represented and illustrated by the one or more ellipsis and extending into different planes such as in x, y and z directions respectively.

The determination component 602 is configured to dynamically determine which device port 604 or 606 of the matrix configuration to which a termination 516, for example, is connected via a signal route among the device ports based on the set of propagation conditions that comprises at least one of a magnitude, a polarization, or a direction of the set of RF communications being received. For example, any one of the device ports 604 among the M rows can be configured to route or be coupled to the termination 514 based on the criteria. The termination route or signal route from a device port 604 to the termination 516, for example, can be selected as a result of other signal routes formed nearby among multiple different switching routes in order to decrease or mitigate a parasitic coupling, for example, or some other multipath propagation effect. Further, the device ports 604 can be antenna ports, or links to one or more antennas, as well as other type ports to one or more other kinds of devices, components, elements, modules or the like. Likewise, the determination component 602 can be configured to determine which antenna port among antenna ports to route to a device port 604 or 606 via switching elements based on a bandwidth corresponding to the antenna port, or an identification of a component carrier from among different component carriers.

The controller 108 can operate in conjunction with the different components as a separate processing device or as one component. For example, the controller 108 can operate to configure the different switching elements based on criteria determined external to the controller with the different other components or as a single unit comprising the components. The controller 108 can operate to determine which of the plurality of switching elements to modify based on a mitigation of an effect that is related to a multi-path propagation, and operate in conjunction with the use component 208, the propagation component 408 and the radio resource component 406, which can also be a part of the controller 108.

As discussed above, the matrix configuration of the switching elements 202 of the matrix switch 102 can be extended in different ways as a function of the different switching elements 202 comprising the matrix. The switching elements 202, for example, can comprise switches that propagate pathways or signal routes in various different directions and dimensional spaces that can provide for light paths, acoustic pathways, electrical paths, signaling paths or other type routes for transmission of different forms of energy. Different matrix configurations are envisioned that can span different arrays of space with different numbers of switching elements comprising additional rows, additional columns, or additional layers (e.g., O layers) in dimensions other than a two-dimensional space. The rows and columns can also comprise layers and be configured in a three-dimensional matrix, for example, with M rows, N columns and O layers, in which M, N and O can comprise an integer of at least one. The matrix switch 102 as illustrated can also represent multiple different matrix switches within the system 600, which can vary in size and dimension with respect to one another.

The switching elements 202 can operate to couple or route in multiple different directions other switches, inputs or outputs, components between antennas, components (e.g., filters, relays, transducers, inductors, etc.) other devices, and in different components thereof via switches of the matrix configuration of the switch 101. For example, the matrix switch can be configured within MIMO devices, in which the device ports can comprise or couple to one or more transceivers having a receiver end and a transmitter end with multiple different antennas at each receiver end and transmitter end for communication in a MIMO channel utilizing beam forming, communication of channel state information, spatial diversity processes, queue state information and like MIMO processes to communicate concurrently or simultaneously to devices within the network environment.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
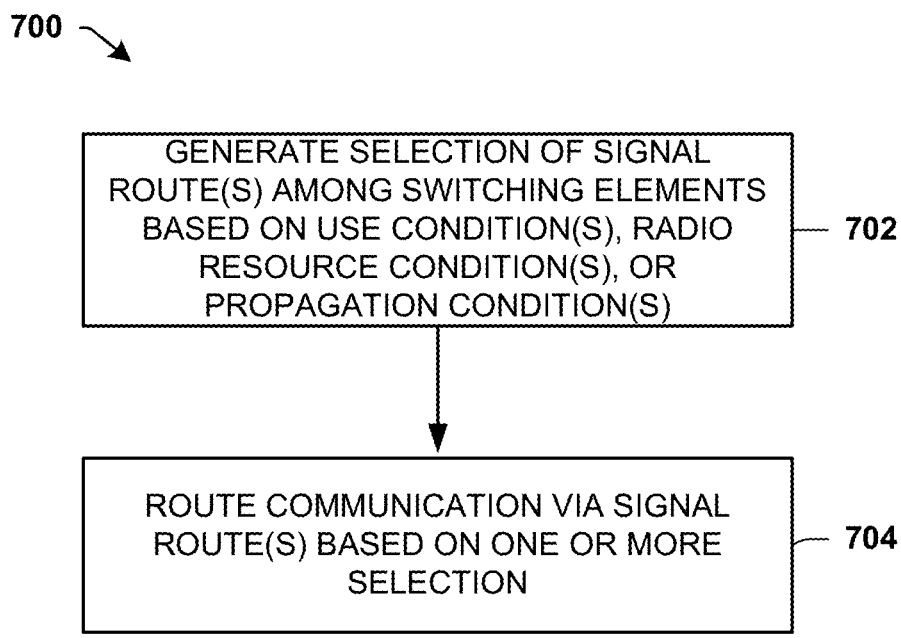
FIG. 7 is a flow diagram illustrating a method of matrix switch operations according to various aspects described.

With reference to FIG. 7, illustrated is a method 700 for operating a matrix switch that generates one or more signal routes for communications. The method 700 initiates at 702 by generating, via a matrix switch with a processing device, a selection of a signal route (e.g., transmission gateway, pathway, channel, path or set of links) via switching elements of the matrix switch to route at least one input and at least one output as a function of one or more criteria comprising a use condition, a radio resource condition, a propagation condition or any combination thereof.

At 704, the method routes, via switching elements of a matrix configuration of the matrix switch, an RF communication along the signal route based on the selection.

In one aspect, the method can further comprise determining which of the plurality of switching elements to activate for the signal route based on at least one of a network bandwidth, an operational frequency, a regional location, a network availability, a mode of operation (e.g., TDD, FDD, device position, effects of other routes generated or being utilized simultaneously) a location of an object, an orientation, a magnitude of the RF communication, a polarization of the RF communication or a direction of the RF communication. The method can include, for example, determining, via a controller or processor, which of the plurality of switching elements to modify based on a mitigation of an effect that is related to a multi-path propagation. The selection of signal routes via switches of the matrix switch can include determining which of the plurality of switching elements to modify based on a diversity of receptions of RF communications with different network bandwidths (e.g., Wi-Fi, 3G, 4G, etc.) as a function of antenna components corresponding to one or more bandwidths. A plurality of signal routes can be generated, for example, via the switching elements of the matrix switch that respectively communicatively couple, or route, antenna components and at least one of a transceiver or a transmitter for a multiple input multiple output device as a function of one or more criteria.

Figure 8:
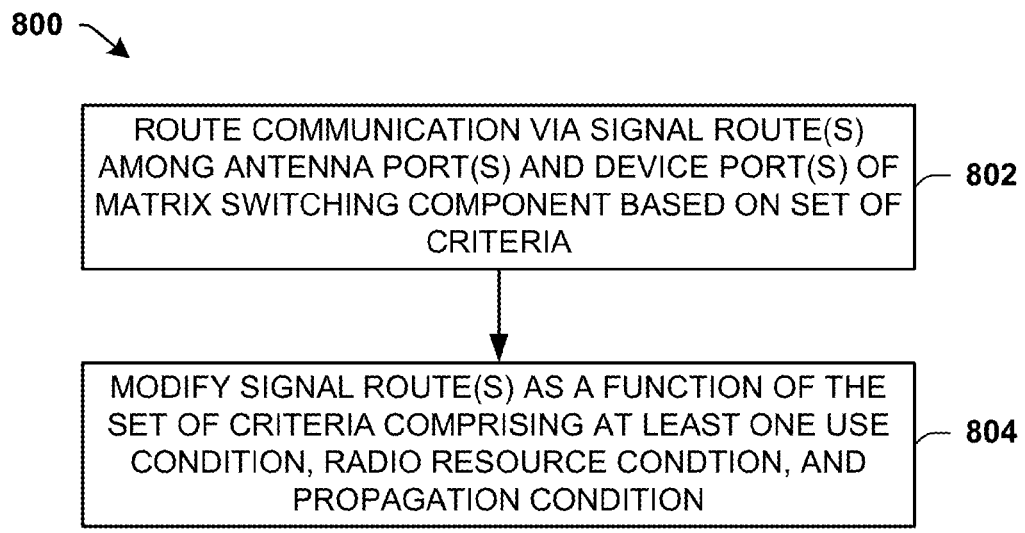
FIG. 8 is a flow diagram illustrating another method of matrix switch operations according to various aspects described.

Referring now to FIG. 8, illustrated is a process flow for operating a matrix switch in accord with various aspects. A method 800 initiates, and at 802 comprises routing one or more RF communications via one or more signal routes among antenna ports and device ports of a matrix switching component based on a set of criteria. At 804, the method 800 further comprises modifying the one or more signal routes as a function of the set of criteria to facilitate the routing of the set of RF communications. The criteria can comprise at least one of a set of use conditions, a set of radio resource conditions, a set of propagation conditions and any combination thereof.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A system comprising:
a matrix switching component, comprising a set of signal routes in a matrix comprising dimensions of at least M rows and N columns, wherein M and N comprise an integer that is at least one and the matrix has a size that is greater than one by one, configured to activate a route communicatively coupling a first path of an antenna component to a second path of a device component, and route a set of communications between the antenna component and the device component through the route based on a set of criteria; and
a control component configured to modify the route, communicatively coupling the first path and the second path, by modifying one or more activated switching elements that form the route to communicatively couple the first path to the second path and activating one or more other activated switching elements within the matrix switch component to form another route between the first path and the second path as same endpoints as the route, as a function of a change in the set of criteria, to facilitate the set of communications between the first path of the antenna component and the second path of the device component as the same endpoints as the route activated prior, wherein the set of criteria comprises at least one of a set of use conditions, a set of radio resource conditions, or a set of propagation conditions.

2. The system of claim 1, wherein the control component is further configured to select which signal routes of the set of signal routes to concurrently route the set of communications between at least two antenna ports and at least two device ports based on the set of criteria.

3. The system of claim 1, wherein the control component is further configured to alter the set of signal routes by modifying one or more switching elements arranged in the matrix to remain connected the antenna component and the device component of the matrix switching component based on a detection of the change in the set of criteria and mitigate cross-noise from at least one other signal route activated within the matrix switching component.

4. The system of claim 1, wherein the matrix switching component comprises at least two antenna ports that correspond to different radio frequencies to route the set of communications via the matrix switching component differently based on the set of criteria that is related to different wireless networks of different radio network devices.

5. The system of claim 1, wherein the matrix switching component comprises a number of switching elements that equal the M rows by the N columns of antenna ports and device ports, wherein the device ports are communicatively coupled to at least one of at least one transceiver, at least one receiver, at least one transmitter or at least one termination.

6. The system of claim 1, further comprising:
a determination component configured to dynamically determine which device port to which a termination is connected among device ports based on the set of propagation conditions that comprises at least one of a magnitude, a polarization, or a direction of the set of communications being received.

7. The system of claim 1, further comprising:
a use component configured to dynamically determine the set of use conditions based on at least one datum from a set of sensors configured to detect one or more objects and facilitate the control component to modify the route between the antenna component and the device component based on the change of the set of use conditions.

8. The system of claim 1, wherein the set of use conditions comprises at least one of a proximity of one or more objects with respect to a set of zones that correspond to the antenna component, a change in a location of the one or more objects or an orientation with respect to the at least one antenna port.

9. The system of claim 1, further comprising:
a radio component configured to dynamically determine the set of radio resource conditions that comprise at least one of bandwidths associated with antenna ports, a network availability, a regional use, or whether a mode of operation comprises a frequency division duplex operation or a time division duplex operation, and facilitate the control component to select the set of signal routes based on the set of radio resource conditions.

10. The system of claim 1, further comprising:
a propagation component configured to dynamically determine the set of propagation conditions that comprises at least one of a magnitude, a polarization, or a direction of the set of communications being received.

11. The system of claim 1, further comprising:
a determination component configured to determine which antenna port among antenna ports to route to the device component based on a bandwidth corresponding to the antenna component and an identification of a component carrier from among a plurality of component carriers.

12. The system of claim 1, wherein the matrix switching component further comprises another dimension of O layers, wherein O comprises the integer that is at least one, and the O layers comprises one or more further switching elements.

13. A device comprising
a matrix switch comprising switching elements in a matrix configuration that route a set of communication inputs and a set of communication outputs of at least M rows and N columns of the matrix configuration, wherein M and N comprise an integer that is at least one, and configured to selectively facilitate communication via signal routes among the set of communication inputs and the set of communication outputs via the switching elements;
a controller configured to generate a first signal route that is configured to communicatively couple an antenna component to a device component to facilitate the communication there-between, and further generate a modification to the first signal route by modifying the plurality of activated switching elements within the matrix switch to communicatively couple the antenna component and the device component as same endpoints as the first signal route with a second signal route that is different from the first signal route based on a change in a set of criteria comprising at least one of a set of use conditions, a set of radio resource conditions or a set of propagation conditions.

14. The device of claim 13, wherein the set of communication inputs or the set of communication outputs comprise connections to antenna components and at least one of a transceiver, a receiver, a transmitter or a termination.

15. The device of claim 14, wherein the antenna components comprise at least one of an antenna, a tuning mechanism associated with the antenna or a frequency tuning circuit associated with the antenna.

16. The device of claim 13, wherein the controller is further configured to modify the first signal route connecting the antenna component with the device component through the matrix switch to the second signal route within the matrix switch to increase a bandwidth capacity with a plurality of component carriers and mitigate an effect of a multipath communication within the matrix switch.

17. The device of claim 13, wherein the controller is further configured to dynamically determine the set of use conditions based on at least one datum from a set of sensors configured to detect one or more objects or a proximity of the one or more objects to one or more zone locations, or an orientation, and generate the modification via the switching elements based on the set of use conditions.

18. The device of claim 13, wherein the controller is further configured to dynamically determine the set of radio resource conditions that comprise at least one of a bandwidth associated with the set of communication inputs and the set of communication outputs, a network availability, a regional use, or whether a mode of operation comprises a frequency division duplex operation or a time division duplex operation, and generate the modification based on the set of radio resource conditions.

19. The device of claim 13, wherein the controller is further configured to dynamically identify the set of propagation conditions comprising a strength, a polarization or a direction of communications, and modify the first signal route to the second signal route from among the signal routes based on the set of propagation conditions via the switching elements of the matrix switch.

20. The device of claim 13, wherein the set of communication inputs and the set of communication outputs correspond respectively to the M rows and the N columns of the matrix configuration of the switching elements, are associated with different operating frequencies, different network bandwidths and different component carriers.

21. A method comprising:
generating, by a matrix switch comprising a processor, a selection of a signal route along a plurality of switching elements of the matrix switch to route a first path of an antenna component and a second path of a device component as a function of one or more criteria comprising at least one of a use condition, a radio resource condition or a propagation condition;
routing, via the plurality of switching elements, a communication along the signal route based on the selection; and
modifying the signal route of the matrix switch connecting the first path of the antenna component to the second path of the device component to a different route within the matrix switch also connecting the first path to the second path by changing altering an activation or a deactivation of one or more switching elements of the plurality of switching elements based on a change of the one or more criteria.

22. The method of claim 21, wherein modifying the signal route of the matrix switch connecting the first path to the second path further comprises:
determining which of the plurality of switching elements to activate for the signal route based on at least one of a network bandwidth, an operational frequency, a regional location, a network availability, a mode of operation, a location of an object, an orientation, a magnitude of the communication, a polarization of the communication or a direction of the communication.

23. The method of claim 21, wherein modifying the signal route of the matrix switch connecting the first path to the second path further comprises:
determining which of the plurality of switching elements to modify based on a mitigation of an effect that is related to a multi-path propagation.

24. The method of claim 21, wherein modifying the signal route of the matrix switch connecting the first path to the second path further comprises:
determining which of the plurality of switching elements to modify based on a diversity of receptions of communications with different network bandwidths as a function of antenna components corresponding to one or more bandwidths.

25. The method of claim 21, further comprising:
generating a plurality of signal routes via the plurality of switching elements of the matrix switch that respectively communicatively couple antenna components and at least one of a transceiver or a transmitter for a multiple input multiple output device as the function of the one or more criteria.

* * * * *